Reissued Apr. 7, 1936 Re. 19,915

UNITED STATES PATENT OFFICE 19,915

DIE CASTING ALLOY

John R. Freeman, Jr., Cheshire, Conn., assignor to The American Brass Company, Waterbury, Conn., a corporation of Connecticut No Drawing. Original No. 2,023,129, dated December 3, 1935, Serial No. 748,113, October 12, 1934. Application for reissue February 14, 1936, Serial No. 63,938

4 Claims. (Cl. 75—153)

This invention relates to a die casting alloy, and has for an object to produce an alloy which gives a much better smoother surface on the casting that doesn't require machining, sand blasting or other finishing operations.

Another object is to provide an alloy which flows readily into the recesses of the die so as to reduce to a minimum the casting of defective castings, and also to permit satisfactory casting of more complicated castings.

Other objects and improved results will become apparent as the description proceeds.

The lowest melting point brass is the alloy of approximately 60% copper and 40% zinc. If we use alloys of much higher melting temperatures we run into difficulties as higher temperatures reduce the life of the dies.

I have discovered that the addition of a small amount of silicon to brasses in the neighborhood of the 60—40 alloy gives a much better surface condition to a die casting of this alloy. The silicon may be in amount from approximately .05% to .5% and preferably from approximately 0.1% to 0.15%. The addition of this amount of silicon gives a much better smoother surface to the die casting, and one that does not require machining, sand blasting or other finishing operations. It also makes the metal flow better into the recesses of the die giving more perfect castings and permitting casting of more complicated castings. In short silicon materially improves the surface condition beyond that obtained by the use of tin. It increases the fluidity of the brass somewhat and tends to reduce drossing, that is tends to reduce deposit of zinc oxide on the die surfaces.

It is desirable to add a small amount of lead to these alloys when used for die casting as the lead keeps it plastic and suitable for casting over a longer range of temperature. It also improves its machinability. The lead used is generally about 1% of the alloy, but may vary from approximately .25% to 3%. It is also desirable to add a small amount of tin as it inhibits or reduces the tendency of the lead to segregate in the pot and to give better fluidity to the alloy. It also increases corrosion resistance. The tin is generally about 1% of the alloy but may vary from approximately .25% to 3%.

It is still further desirable to add a small amount of aluminum for the following reasons. Zinc has a relatively low melting point. That is, it has a high vapor tension at the melting temperature of brass so it tends to vaporize and form clouds of zinc oxide, and to form dross on top of the melted metal as it is ladled out. Aluminum has the characteristic of forming a very tight aluminum oxide film over the top of the liquid and acts to prevent oxidation of the underlying metal. The aluminum therefore reduces the zinc flame and the loss of zinc. It prevents or reduces drossing in the holding pot, and reduces the zinc oxide and copper oxide which is likely to be entrapped in the casting to make it unsound. The aluminum may be from approximately .05% to 1% and preferably about 0.1%.

The general composition of copper approximately 60% and zinc 40% is of course well known. A general composition of copper 60%, lead 1%, tin 1% and remainder zinc is also old, but I have found that the addition of silicon from approximately .05% to .5% to these alloys gives the improved characteristics as above described, particularly for die-castings, that is it increases the fluidity of the alloy, reduces oxidation, particularly of the zinc, and gives a much superior surface to the resulting casting. As stated above the preferred silicon content is from approximately 0.1% to 0.15%.

The improvement secured by the addition of silicon is not confined to an alloy of approximately 60% copper and 40% zinc, but for die casting it is desirable to keep the copper about 60%, say from about 59% to about 61%, as alloys today for die casting are limited to those of relatively low melting points because of the limitations of die steels at present commercially available. However, my tests have shown that a similar use of silicon in brasses of higher copper content gives similar results. With increasing copper content the silicon content may be increased if desired in proportion of the coefficient of equivalents of silicon to zinc. Brasses with a copper content of approximately 55% to 75% can be die cast but at the present time the die casting of the high copper brasses is not commercially practical because of their relatively high melting points and consequent shortened life of metallic dies, generally steel dies, used in the die casting process. It would not be advisable to go above about 43% zinc figured by equivalents.

An alloy range I have found very satisfactory in die casting is approximately the following:

| | Per cent |
|---|---|
| Copper | 59 –61 |
| Tin | .5 – 1.5 |
| Lead | .5 – 1.5 |
| Aluminum | .05– .15 |
| Silicon | .1 – .2 |
| Zinc | Balance. |

A specific die casting alloy which is very satisfactory is approximately the following:

| | Per cent |
|---|---|
| Copper | 60.00 |
| Zinc | 37.75 |
| Lead | 1.00 |
| Tin | 1.00 |
| Silicon | 0.15 |
| Aluminum | 0.10 |

Having thus set forth the nature of my invention, what I claim is:

1. A die casting alloy characterized by superior fluidity and superior surface finish in the as cast condition comprising approximately 55% to 75% copper, lead from .25% to 3%, tin from .25% to 3%, aluminum from .05% to 1%, silicon from .05% to .5%, and balance zinc.

2. A die casting alloy characterized by superior fluidity and superior surface finish in the as cast condition comprising approximately 59% to 61% copper, .5% to 1.5% tin, .5% to 1.5% lead, .05% to .15% aluminum, .1% to .2% silicon, and balance zinc.

3. A die casting alloy characterized by superior fluidity and superior surface finish in the as cast condition comprising approximately 60% copper, 1% lead, 1% tin, .1% aluminum, .05% to .5% silicon, and balance zinc.

4. A die casting alloy characterized by superior fluidity and superior surface finish in the as cast condition comprising approximately 60% copper, 37.75% zinc, 1% lead, 1% tin, 0.15% silicon, and 0.10% aluminum.

JOHN R. FREEMAN, Jr.